Feb. 11, 1969   G. F. MANGUM ET AL   3,426,528
LINER CONFIGURATION FOR SOLID PROPELLANT ROCKET MOTORS
Filed Dec. 27, 1966

Grafton F. Mangum INVENTORS
Carl J. Whelchel

BY

ATTORNEY

United States Patent Office 3,426,528
Patented Feb. 11, 1969

3,426,528
LINER CONFIGURATION FOR SOLID
PROPELLANT ROCKET MOTORS
Grafton F. Mangum and Carl J. Whelchel, Huntsville, Ala., assignors to Thiokol Chemical Corporation, Bristol, Pa., a corporation of Delaware
Filed Dec. 27, 1966, Ser. No. 604,973
U.S. Cl. 60—39.47         3 Claims
Int. Cl. F02c *3/26;* F02k *9/04;* F42b *9/14*

ABSTRACT OF THE DISCLOSURE

This invention relates to a solid propellant support configuration comprising a plurality of juxaposed members positioned between and bonded to a solid propellant liner and a rocket motor casing but unbonded to one another.

---

This invention relates to improvements in liner configurations for solid propellant rocket motors and more particularly to a liner configuration that permits case bonding of a solid propellant to a rocket motor case without resultant fracture of the solid propellant grain or separation of the grain from the motor case resulting from stresses caused by cure shrinkage, thermal, pressurization or acceleration environments.

One of the most difficult problems that arises during the production of a solid rocket motor is the maintenance of an adequate bond between the solid propellant, the insulation and the rocket motor case. Many solutions to this problem have been tried, for the fracture and separation of the solid propellant from the insulation and the motor case present many difficulties in producing the rocket motor. This results many times in the complete destruction of the solid propellant rocket motor before it completes its mission or, in some cases, almost immediately after the ignition and subsequent burning of the solid propellant even before the solid propellant rocket motor has left the ground.

Propellant shrinkage, normal to manufacture of composite solid propellants, and differences in thermal expansion of propellant and rocket motor case materials, as well as expansion due to motor pressurization, places high stresses on these components used in rocket motor production, creating separation or fractures that create voids in the propellant that cause disastrous results upon the ignition of the solid propellant.

It is an object of this invention, therefore, to provide a liner configuration that permits perfect bonding of the solid propellant to the insulation and the motor case, while at the same time possessing a stress relieving characteristic that prevents any undue separation or fracture of the solid propellant.

The liner configuration embodying the instant invention will not only lower the low temperature operating characteristics of the rocket motor, but will also allow the practical use of high web fraction rocket motors in that it will provide sufficient bonding of the solid propellant to the insulation and the motor case so that all stress loads will be equally distributed therein when the solid propellant is under high acceleration conditions. The liner configuration embodying the invention is also applicable to rocket motors requiring high radial spin rates, as well as rocket motors that have a zero rate.

The use of the liner configuration is not limited to any specific type of solid propellant configuration, but is adaptable to all types of configurations from an end burning type of rocket motor to a solid propellant having many types of cylindrical perforated designs therein.

With the above and other objects and advantages in view, the invention consists of the novel details of construction and arrangement of parts more fully hereinafter described, claimed and illustrated in the accompanying drawing in which:

Figure 1:
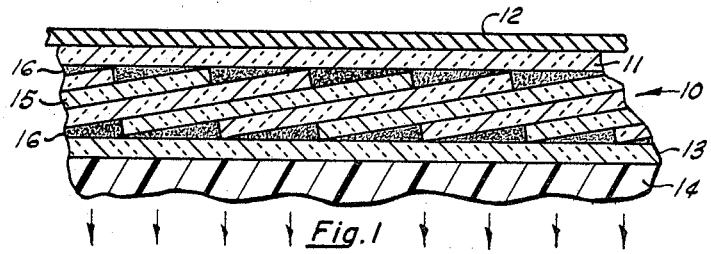
FIGURE 1 is a fragmentary sectional view showing the liner configuration embodying the invention under compression.
Figure 2:
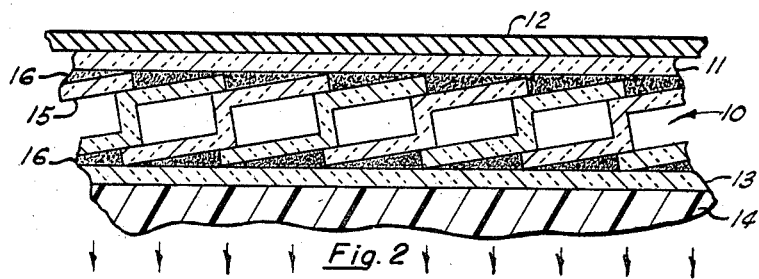
FIGURE 2 is a similar view, showing the liner configuration expanded.

Referring more in detail to the drawing and more especially to FIGURES 1 and 2 thereof wherein like parts are designated by like reference numerals, the reference numeral 10 is used to designate a liner configuration embodying the instant invention.

The liner configuration 10 comprises an outer layer 11 which is bonded on the outer surface to the inner surface of a rocket motor case 12 and an inner layer 13 which is bonded on the outer surface to the outer surface of a solid propellant 14 that is positioned within the motor case 12 by any well-known normal procedure.

The outer and inner layers 11 and 13 extend longitudinally of and are bonded to the entire inner surface of the motor case 12 and the entire outer surface of the solid propellant 14.

Positioned between the outer and inner layers 11 and 13, in partial overlapped relation to each other, are a plurality of strips or layers 15 and these strips or layers 15 also extend longitudinally of the motor case 12.

That portion of the strips or layers 15 that is in immediate contact with the surfaces of successive strips or layers 15 are not bonded to each other, but the outer surfaces of the strips or layers 15 are bonded alternately by a suitable bonding agent 16 to the inner surfaces of the outer and inner layers 11 and 13 as more readily seen in FIGURES 1 and 2.

The outer and inner layers 11 and 13 and the strips or layers 15 may be formed from types of materials which possess varying degrees of flexibility, such as rubber, glass, glass or metal reinforced plastics or other high modulus materials, such as metal or ceramics or graphitized fabrics of conventional design.

The solid propellants utilized may include composites of various forms, as well as composite modified double base and double and triple base propellants.

The insulation configuration 10 is prefabricated before it is installed in the motor case 12 by applying the bonding agent 16 to the inner surface of the inner layer 13, applying and bonding the strips or layers 15 thereto, applying the bonding agent to the strips or layers 15 and then bonding the inner surface of the outer layer 11 to the strips or layers 15. This procedure may be reversed if desired and the outer and inner layers 11 and 13 may or may not have one severance cut longitudinally thereof, in other words the assembly of the various components of the insulation configuration 10 may proceed in the most convenient manner.

After the outer layer 11 has been bonded to the inner surface of the motor case 12, the solid propellant 14 may be slightly rotated as it is temperature cycled, after it has been bonded to the inner layer 13, as shown in a somewhat exaggerated manner in FIGURE 2. Thus, regardless of the thermal expansion or contraction of the motor case 12 and the solid propellant 14, there will always be a perfect bond between the solid propellant 14, the insulation configuration 10 and the motor case 12. Thus all load stresses, as applied to the rocket motor, will be compensated for by the liner configuration 10.

Figure 3:
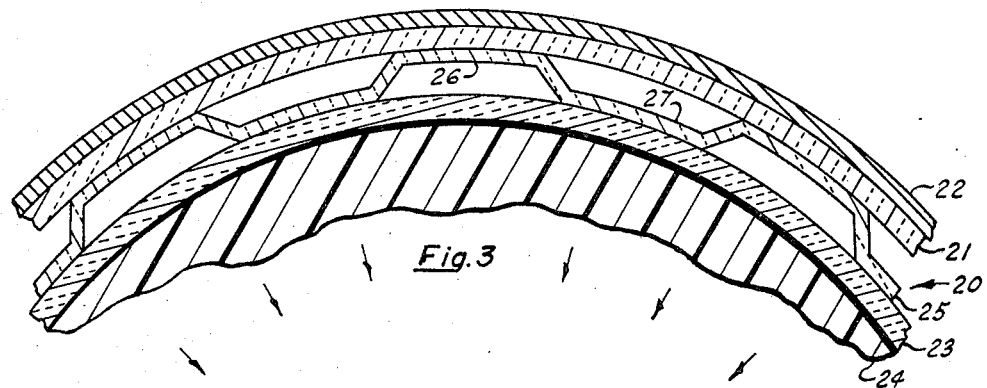
FIGURE 3 is a fragmentary sectional view of a modified form of liner configuration in expanded position.

In FIGURE 3 wherein a modified form of insulated configuration 20 is shown, the outer surface of the outer layer 21 thereof is bonded to the inner surface of the motor case 22, the outer surface of the inner layer 23 is bonded to the outer surface of the solid propellant 24, but the strips or layers 15 are now formed as a single intermediate layer 25 that has the outer surface of alternate portions 26 and 27 thereof bonded to the inner surfaces of the outer and inner layers 21 and 23 of the liner configuration 20. The inner surfaces of the portions 26 and 27 are, however, unbonded so that, as shown in FIGURE 3, these unbonded surfaces of the portions 26 and 27 permit expansion of the liner configuration 20 during the thermal expansion and contraction of the motor case 22 and the solid propellant 24.

Figure 4:
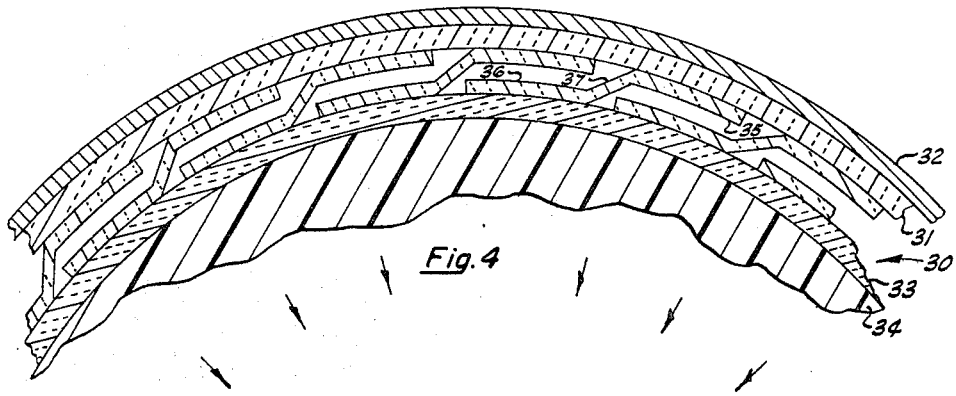
FIGURE 4 is a fragmentary sectional view of another modified form of liner configuration also in expanded position.

In FIGURE 4 wherein another modified form of an insulation configuration 30 is shown, the outer surface of the outer layer 31 thereof is bonded to the inner surface of the motor case 32, and the outer surface of the inner layer 33 is bonded to the outer surface of the solid propellant 34.

The intermediate layer 25 of FIGURE 3 in this form of the invention is severed at the outer ends of the portions 26 and 27 to provide portions 35 and 36 and of a plurality of strips or layers 37. The outer surfaces of the portions 35 and 36 of the strips or layers 37 are bonded to the inner surfaces of the outer and inner layers 31 and 33, but the inner surfaces of the portions 35 and 36 of the strips 37 are unbonded as are the inner surfaces of the portions 26 and 27, as in FIGURE 3, to permit the expansion of the liner configuration 30 during the thermal expansion and contraction of the motor case 32 and the solid propellant 34.

The liner configurations 20 and 30 may be assembled in the same manner, as described in the assembly of the liner configuration 10, but there is no necessity in rotating the solid propellant 34 as it is cycled as previously described, for the installation of the liner configuration 10.

It is the inherent flexibility of the liner configurations 20 and 30 that permits the expansion thereof while maintaining a perfect bond between the liner configurations, the solid propellant and the motor case.

Basically all forms of the liner configurations have bonded and unbonded portions and it is this particular arrangement of these components that permit the liner configurations to compensate for the thermal expansion and contraction of the solid propellant and the motor case.

It is believed that from the foregoing description the manner of assembly and installation of the liner configurations will be clear to those skilled in the art and it is further understood that variations in such asesmbly and installation may be adhered to providing such variaitons fall within the spirit of the invention and the scope of the appended claims.

Having thus described the invention what is claimed as new and desired to be secured by Letters Patent is:

1. The combination with a solid propellant rocket motor including a motor case and a solid propellant therein, of a liner configuration that is interposed immediately between the motor case and the solid propellant and comprising inner and outer members that are bonded on their outer surfaces to the inner and outer surfaces of the motor case and solid propellant and an intermediate member that has portions thereof alternately bonded to the inner surfaces of said inner and outer members and portions thereof that are alternately unbonded to the inner surfaces of said inner and outer members.

2. The combination as in claim 1, wherein said intermediate member comprises a plurality of strips or layers that are positioned between said inner and outer members in overlapping relation to each other.

3. The combination as in claim 1, wherein said intermediate member comprises a single layer having alternately bonded and unbonded portions.

References Cited

UNITED STATES PATENTS

| | | | |
|---|---|---|---|
| 2,733,568 | 2/1956 | Dickinson | 60—255 |
| 2,995,011 | 8/1961 | Kimmel | 60—255 |
| 3,319,424 | 5/1967 | Haake | 60—255 |

CARLTON R. CROYLE, *Primary Examiner.*

U.S. Cl. X.R.

60—265; 102—103